J. H. REID.
PROCESS OF SECURING COMBUSTIBLE FLUIDS FROM CARBONACEOUS SOLIDS.
APPLICATION FILED AUG. 26, 1915.
1,224,788.  Patented May 1, 1917.
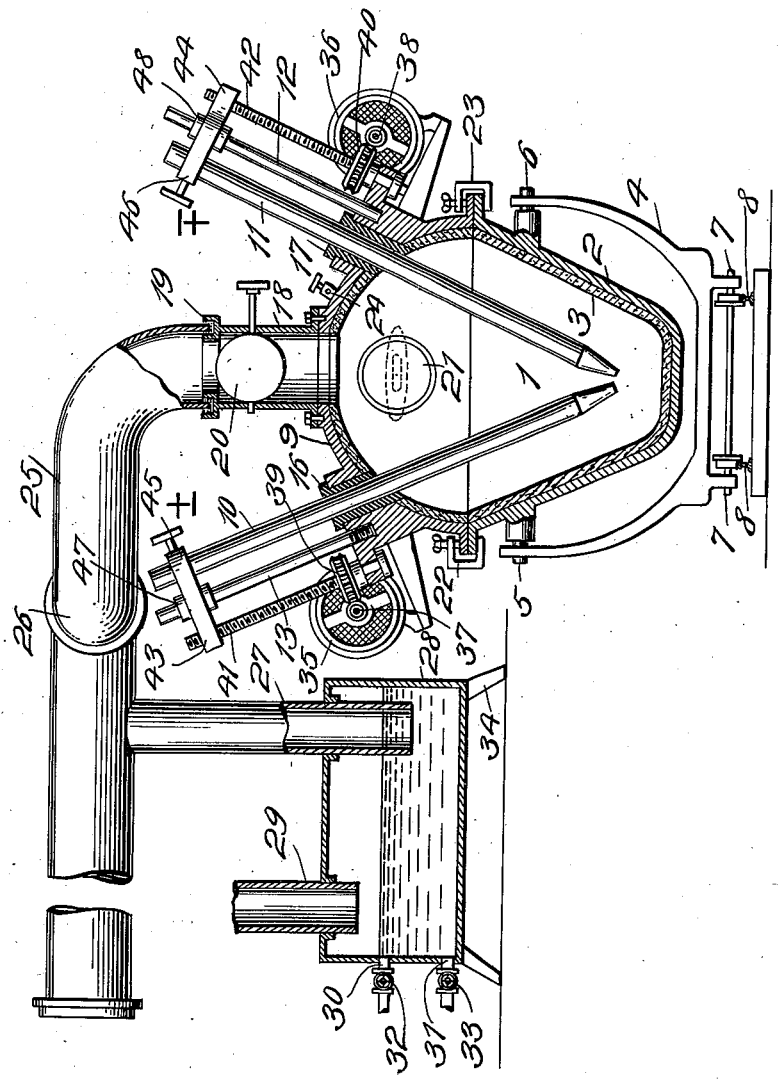
WITNESSES:
INVENTOR
James Henry Reid.
BY
ATTORNEY

UNITED STATES PATENT OFFICE.

JAMES HENRY REID, OF NEWARK, NEW JERSEY, ASSIGNOR TO PATENTS PROCESS COMPANY, A CORPORATION OF MAINE.

PROCESS OF SECURING COMBUSTIBLE FLUIDS FROM CARBONACEOUS SOLIDS.

1,224,788. Specification of Letters Patent. Patented May 1, 1917.

Application filed August 26, 1915. Serial No. 47,537.

*To all whom it may concern:*

Be it known that I, JAMES HENRY REID, a citizen of the United States, residing at 352 Mulberry avenue, in the city of Newark, county of Essex, State of New Jersey, have invented certain new and useful Improvements in Processes of Securing Combustible Fluids from Carbonaceous Solids, of which the following is a specification.

This invention relates to a process for the production, distillation or sublimation by direct, fractional, destructive, or other means, of hydrocarbons and production of products from residues and has for one of its objects the securing of the products of fractional or destructive distillation of hydrocarbons, such as bituminous coal, coal tar, or other substance capable of yielding carbon by the action of heat and the making of products with what would be the non-volatile carbonaceous residues during the operation of the process, such as calcium carbid, which may be obtained by mixing calcium oxycompounds, such as calcium oxid or substances capable of forming the same such as calcium carbonate, with bituminous coal and subjecting the mixture to the action of electricity as hereinafter set forth, and comprises specifically exposing coal of the bituminous variety, while associated with an electrical resistor, to the action of electricity of sufficient volume and intensity to operate against the resistance of the substance employed and produce a temperature sufficient to evolve the product desired, or subjected to the action of electricity of progressively varying character so that varying degrees of temperature may be generated within the charge and various products evolved and secured, such as the separate constituents of coal tar viz., benzol, toluol, xylol, etc., instead of coal tar *per se*, or the whole of the products may be driven off as a composite composition and the constituents recovered thereafter by fractional distillation.

As an illustration of the invention and the manner in which it may be employed the production of tar and other ingredients or substances evolved by the destructive and other distillation of bituminous shale together with the production of carbid, such as calcium carbid, will be taken, reference being directed to the accompanying drawing which diagrammatically indicates a form or character of apparatus adaptable to the operation of the process in which the drawing represents a longitudinal vertical view partly in section of an electric converter, furnace or still, showing means for collecting, condensing and securing the volatile and volatilized products.

Referring to the drawing the numeral 1 represents an electric furnace in which the substances are converted, comprising the receptacle 2 provided with a lining 3 and supported by the support 4 by means of the trunnions 5 and 6 the said support 4 being provided with the roller bearing and shaft 7 resting on the track 8 whereby it may be rolled into position and therefrom after the materials in the receptacle 2 have been acted upon or converted. The receptacle 2 is provided with a top or cover 9 through which pass the electrodes 10 and 11 which are supported by the supports 12 and 13 through the insulation guides 46 and 47, the said electrodes passing through the cover 9 and provided with the insulation sleeves 16 and 17. From the cover extends the outlet 18 provided with the fluid seal 19 and the revolving damper 20. The upper section or cover 9 is also provided with a sealed feed inlet 21 the removable seal of which may be removed and replaced while supplying ingredients to the apparatus during the performance of the process and closed during the condensing operation thereof. The lower section 2 and the upper section 9 are secured to each other by means of the screw clamps 22 and 23. The upper section 9 of the converter is provided with a means 24 for providing an electrical connection to the converter opposite to that of the electrodes 10 and 11 and which means is of attachable and detachable nature. The outlet 18 with its fluid seal 19 communicates with a removable conduit 25 operating through the swinging joint 26. This conduit communicates with an outlet 27 leading to the reservoir 28 and through which the condensed volatile products pass to the same, the reservoir 28 being provided with an outlet 29 for the permanent gases and whereby the said gases are conveyed to a reservoir (not shown). The reservoir 28 for the distillates is provided with the outlet 31 controlled by the valve 33 at the lower part thereof and the outlet 30 controlled by valve 32 at a higher point for removal of lighter products when the reservoir contains water. The reservoir 28 is also provided with the legs or supports 34.

As an example of the operation of the invention, the production of calcium carbid from bituminous shale and lime, calcium oxid, and the recovery of the tar or volatile products evolved during the action of electricity on the composition will be taken.

A mixture of pulverized bituminous shale and calcium oxid in proportion of one hundred pounds of bituminous shale to 150 pounds of calcium oxid, pulverized, are thoroughly mixed and introduced into the receptacle 2 through the opening 21. It is advisable to mix with this composition about 5% of granulated charcoal in order to produce a resistance conductor and provide a means for starting the passage of the electric current through the mass at a comparatively low voltage and also provide a means for initially heating the mass through the agency of electricity and also provide a means for rendering the mass more or less porous so that the volatile products produced by the action of the heat may be more readily evolved and discharged from the mixture. When the mixture has been introduced into the apparatus the supply opening 21 is sealed and a current of electricity passed through the mixture from the electrodes 10 and 11 to the receptacle 2 by means of said electrodes and the contact 24 of the apparatus. As the current passes through the mixture of bituminous shale and lime by means of the conductive resistance charcoal the heat generated by the resistance causes the evolution and distillation of various volatile products which condense and accumulate in the reservoir 28 from which they may be recovered and the different ingredients secured by fractional distillation or the electric current may be so regulated that each individual volatile ingredient produced by the destructive distillation of the hydrocarbon in the converter 2 may be individually and separately secured during the process of destructive distillation, the temperature being regulated by moving the electrodes through the insulating sleeves 16 and 17. When all the volatile products have been distilled off the residual non-volatile carbonaceous matter associated with the lime is heated to a high degree through the passage of electricity and thereby converted into calcium carbid which is finally removed from the receptacle 2 by removing the clamps 22 and 23 and the cover 9 with its electrodes and inverting the receptacle on its trunnions 5 and 6, the apparatus being removed from its position on the tracks 8 and a new apparatus rolled into position and the cover 9 attached and operations performed as before. The outlet 18 is provided with a damper 20 which may be regulated by revolution to suitably check the outflow of volatile products evolved during the process of operation, the conduit 25 may be raised and disconnected from the fluid seal device 19 which seal is preferably maintained by means of a low fusible metal.

By exposing the solid hydrocarbon and a conductive resistance such as bituminous coal or shale and charcoal, to the action of controlled electric currents, the internal resistor will produce internal heat so that the substance will be transformed throughout in a regular and complete manner and will yield a larger percentage of products of more uniform character than in processes devised hereto, so that the lighter hydrocarbons are not disrupted or "cracked" and such compounds as ammonia are more largely produced and secured without decomposition, by reason of the fact that different degrees of heat selective to yielding and volatilizing each product may be generated and maintained until each is driven off below its dissociating point by action of heat and then the temperature elevated internally to yield the next higher carbon containing product having a higher volatilizing point.

The nonvolatile carbonaceous residue remaining after the evolution of the more volatile and less carbon-containing products comprises very heavy hydrocarbon which reacts with the metal oxycompound, such as calcium carbonate or oxid, at elevated temperatures and produces calcium carbid directly from the coked lime which is bonded with and by the heavy non-volatile hydrocarbon.

Other metal oxycompounds may be employed instead of calcium such as barium, or other metal a carbid of which is desired, or any nonmetal oxycompound a carbid of which is desired, such as silica for producing silicon carbid. or so called carborundum may be produced.

The metal oxycompound may be a metal oxid, such as calcium oxid, or substance capable of forming or yielding the same by the action of heat, or ingredients of the composition or both, such as calcium carbonate.

The hydrocarbon employed is of the solid variety under ordinary atmosphere conditions and preferably of the mineral species, or substances derived therefrom, such as bituminous coal, lignite, cannel coal, asphalt, or other solid mineral of organic origin, and the resistor of conductive nature may be of any kind or character other than charcoal such as silicon carbid heated by other substances.

The various volatile products produced by the action of electricity through the electrical resistance of the carbon-yielding substances operated on may be produced and collected as a composite composition and separated from each other by subsequent fractional distillation or each may be secured as it is produced by maintaining the electrical condition necessary and capable of producing each independently until each has been evolved and the character of electricity supplied altered to yield a next progressively higher carbon-containing product, whereby the products may be directly obtained separate from each other.

Silicon carbid may also be made by mixing silica or silicates with the mineral hydrocarbon or carbon-yielding substance instead of metal carbid or any mixture of metal and nonmetal carbid may be produced.

The term "carbid" employed herein is intended to include and does include broadly any nonvolatile carbid of a metal or nonmetal which may be produced by the action of solid hydrocarbon and electricity on a compound of such metal or nonmetal a carbid of which is desired, as herein set forth.

The transformation of ingredients may also be induced and maintained by the action of electricity or an electric current on an inert electrical resistor as a source of heat, such as silicon carbid, associated or communicating with the ingredient to be acted upon as well as carbon such as coke added or produced in the process without departing from the spirit of the invention.

By inducing internal heat by electrical action, a more perfect and controlled transformation of the material acted upon into the product is uniformly maintained without contamination, and also the yield of any individual product desired increased over that secured by any of the means of the prior art, which depends upon the application or employment of externally applied heat for bringing about the destructive distillation and fractional separation of similar carbonaceous substances, and the production of similar products.

Instead of employing bituminous shale with a resistor, from which tar or its products may be obtained other carbonaceous shales such as oil shales may be employed in which latter case shale oil products may be obtained.

Having now described my invention what I claim as new and desire to secure by Letters Patent is:—

1. The process of securing combustible fluids from carbonaceous solids, which comprises associating the substance to be acted upon with an electrical conductive resistor and passing electricity therethrough until the desired product is evolved and then securing such product.

2. The process of securing combustible fluids from carbonaceous solids, which comprises associating a substance containing fixed hydrocarbons with an electrical conductive resistor and passing electricity therethrough until the desired product is evolved and then securing such product.

3. The process of securing combustible fluids from carbonaceous solids, which comprises associating a carbonaceous shale with an electrical conductive resistor, and passing electricity therethrough until the desired product is evolved and then securing such product.

4. The process of securing combustible fluids from carbonaceous solids, which comprises associating the substance to be acted upon with charcoal and passing electricity therethrough until the desired product is evolved and then securing such product.

5. The process of securing combustible fluids from carbonaceous solids, which comprises associating a substance containing fixed hydrocarbons with charcoal and passing electricity therethrough until the desired product is evolved and then securing such product.

6. The process of securing combustible fluids from carbonaceous solids, which comprises associating a carbonaceous shale with charcoal and passing electricity therethrough until the desired product is evolved and then securing such product.

7. The process of securing combustible fluids from carbonaceous solids, which comprises associating the substance to be acted upon with an electrical conductive resistor, passing electricity therethrough until the desired product is evolved, securing such product, and supplying the substance to be decomposed while producing the fluid products.

8. The process of securing combustible fluids from carbonaceous solids, which comprises associating a substance containing fixed hydrocarbons with an electrical conductive resistor, passing electricity therethrough until the desired product is evolved, securing such product, and supplying the substance containing fixed hydrocarbons while producing the fluid products.

9. The process of securing combustible fluids from carbonaceous solids, which comprises associating a carbonaceous shale with an electrical conductive resistor, passing electricity therethrough until the desired product is evolved, securing such product, and supplying the carbonaceous shale while producing the fluid products.

10. The process of securing combustible fluids from carbonaceous solids which comprises associating the substance to be acted upon with charcoal, passing electricity therethrough until the desired product is evolved, securing such product, and supplying the substance to be decomposed while producing the fluid products.

11. The process of securing combustible fluids from carbonaceous solids, which comprises associating a substance containing fixed hydrocarbons with charcoal, passing electricity therethrough until the desired product is evolved, securing such product, and supplying the substance containing fixed hydrocarbons while producing the fluid products.

12. The process of securing combustible fluids from carbonaceous solids, which comprises associating a carbonaceous shale with charcoal, passing electricity therethrough until the desired product is evolved, securing such product, and supplying the carbonaceous shale while producing the fluid products.

In testimony whereof I affix my signature in the presence of two witnesses.

JAMES HENRY REID. [L. S.]

Witnesses:
PHILIP LOFF,
L. HALSEA CROSIER.